June 24, 1969  J. M. DELI ET AL  3,451,727

SEALED JOINT WITH METAL LINED BUSHING RECESS

Filed July 5, 1967

Inventors:
Jack M. Deli
Robert C. Storck
By John W. Haines
Atty.

United States Patent Office 3,451,727
Patented June 24, 1969

3,451,727
SEALED JOINT WITH METAL LINED BUSHING RECESS
Jack M. Deli, Wheaton, and Robert C. Storck, Glen Ellyn, Ill., assignors to International Harvester Company, Chicago, Ill., a corporation of Delaware
Filed July 5, 1967, Ser. No. 651,180
Int. Cl. B60s 1/62; B62d 25/16; F16j 15/38
U.S. Cl. 305—11                                    17 Claims

ABSTRACT OF THE DISCLOSURE

Track link joint having a bushing recess and a pin bushing projecting thereinto, the recess being a counterbore formed in the outer link of the joint and lined with a metal wear facing. A counterbore in the inner link forms a second link recess, the two recesses receiving Belleville spring washers engageable with flanges on the head and foot of the metal liner or facing so as to form a duel sealed joint about the pin bushing and a track pin that is rotatably received in the bushing.

---

This invention relates to a lined seal recess in a track pin joint, and to a dual seal, each of the three-element type, for a pin and bushing present in the track chain of a crawler vehicle. Two of the three elements of each seal are Belleville spring washers of differing diameter, and the third element is a liner cup carrying a small diameter head flange and a larger diameter foot flange which trap the respective small and large Belleville spring washers against the respective bushing and inner link of the joint. The Belleville washers are ring springs, made of thin steel and dished into a frusto-conical shape so as to elastically resist axial deflection of the joint.

According to practice in the past, each of the outer link portions of a track chain are bored to receive a pin and are counterbored to receive the end of a bushing in which the pin is rotatably received. The counterbore forms a seal recess which, in case the seal is allowed to rotate relative to the base of the recess, will wear so as to become an unsound counterbore and which, in any case, is unlined in accordance with the past practice so that the cylindrical sidewall of the counterbore will wear due to the lack of protection and independently cause an unsound counterbore will wear due to lack of protection and independently cause an unsound counterbore. The difficulty is that, either way, the link must be reworked or entirely replaced.

The present lined and dual sealed counterbore and joint materially reduce if not substantially eliminate the foregoing difficulty, all as will now be explained. Various features, objects, and advantages will either be specifically pointed out or become apparent when, for a better understanding of our invention, reference is made to the following description taken in conjunction with the accompanying drawing which shows a preferred embodiment thereof and in which.

Figure 1:
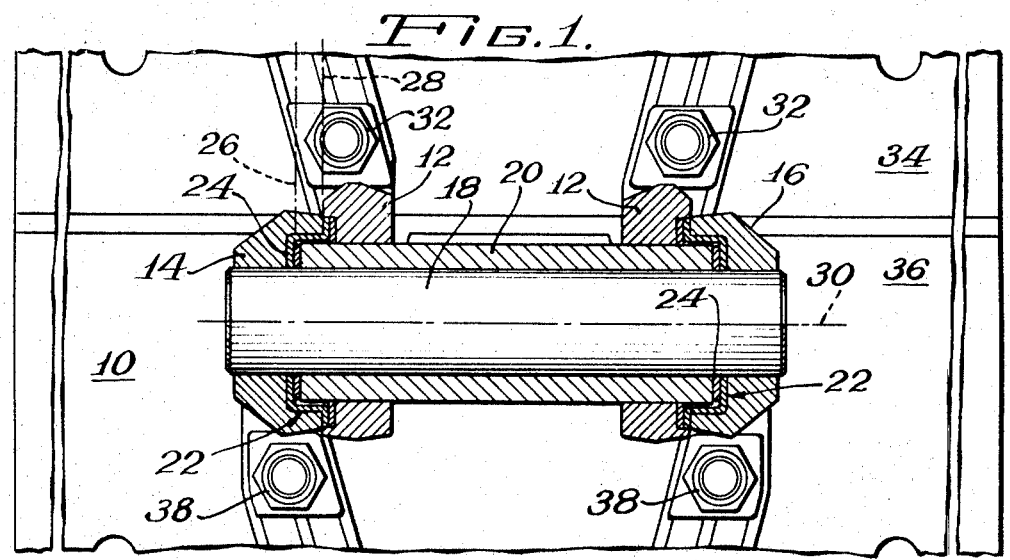
FIGURE 1 is a post-assembly showing in sectioned plan view, of part of the track chain of a crawler vehicle.

More particularly as shown in the drawing, each joint in the illustrated track chain assembly 10 includes two links having inner portions referred to as inner links 12, two more links having outer portions referred to as respective outer links 14 and 16, a pin 18 and a pin bushing 20 rotatable thereon, and two assemblies 22 disposed one at each end of the pin 18 to provide dual sealing and generally located in a seal recess 24 in each of the outer links 14 and 16.

The seal recess 24 in each outer link results from counterboring same so as to house therein the projecting thrust end portion of the bushing 20, thus protecting the radially disposed end face of the bushing from direct ingress of dirt. The plane of one of the dual seals of the assembly 22 is indicated at 26, material axially offset from the plane 28 between the links of the joint, and the plane 27 (FIGURE 3) of the other of the dual seals is axially offset in the opposite direction from the plane 28 between the links.

At the point of beginning the final stage of assembly of the joint, the only parts fitted up at that time are each inner link 12 and the pin 18, which have respectively an interference fit with the bushing 20 achieved with a power press, and a hinge fit with the bushing 20 which, after lubrication of the bore in the bushing, is achieved by sliding the pin 18 thereinto until it protrudes at each end beyond the corresponding end of the bushing.

The final stage of assembly is accomplished with the joint arranged with its longitudinal axis 30 horizontal, and with the assemblies 22 in the path of approach movement of the two outer links. Then, under axial power, the two bored outer links 14 and 16 are forced onto and along the pin 18 toward one another. When relative axial movement stops, the bushing 20 acts as spacer and the power press builds to a predetermined force value, at which time each of the assemblies 22 is trapped. Thereafter, pressure is released in the press and the assembly is removed complete.

The bolts 32 of a four-bolt group secure the inner links 12 to a leading track shoe 34 carried thereby, and the next or relatively trailing shoe 36 is secured to the outer links 14 and 16 by a similar four-bolt group including the two bolts 38. During forward motion of the vehicle, not shown, the so-called leading shoe 34 is the first one of the two to strike the ground and is the first one of the two to reach the drive sprocket, not shown, of the vehicle equipped with the present crawler track chain.

Figure 2:
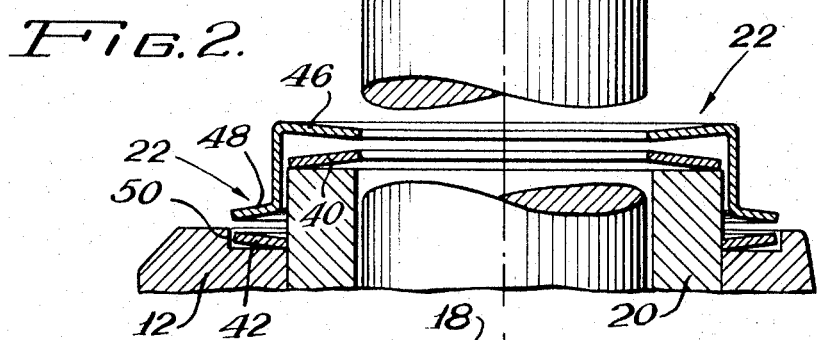
FIGURE 2 is a pre-assembly showing, to enlarged cross sectional scale, of a detail of FIGURE 1.

Each seal assembly 22 consists of three elements and collectively they provide for dual sealing of the joint, the inner end elements being Belleville spring washers, the smaller washer 40 of which having a conical, relaxed position as shown in solid lines in FIGURE 2. The larger diameter washer has the conical relaxed position indicated by the showing at 42 in solid lines in FIGURE 2. The two washers 40 and 42 converge and flare in opposite directions from one another, i.e., they face away from one another and can have approximately equal cone angles when relaxed.

The third element is the outer one consisting of a liner cup 44 having a cylindrical body complementary to the sidewall of the recess 24 and received therein. A radially inturned integral head flange 46 converges slightly axially inwardly with respect to the cup 44 so as to have a frusto-conical shape giving the flange the characteristics of a Belleville spring. A radially out-turned foot flange 48 flares axially away from the cup 44 and is frusto-conical in shape so as to serve as a Belleville spring. The entire cup 44 is hardened steel and the flanges thereof cooperate with the respective spring small and large diameter washers 40 and 42 to provide the dual sealing desired. At the outset, the small diameter seal is flat between the bushing and the base of the outer link recess 24 as shown in FIGURE 1, and the large diameter seal is flat within an inner link recess 50 which confronts the outer link recess 24.

In operation in a new joint, each assembly 22 theoretically shows signs of a transition with the first perceptible increment of rotative wear. The axial thickness of the seal recesses 24 and 50 does not change, whereas the metal at the dual sealing points becomes slightly thinner. From their flat deflected position, the small diameter Belleville springs 40 and 46 begin to cone in the direction of one another and, in place of the essentially flat-face-to-face contact theretofore, the inner periphery of each spring along its external face establishes a ring of pressure contact tending more and more to vacate the outer circumference and concentrate along the mutually apexing inner periphery of the springs. In the large diameter seal, the two Belleville springs 42 and 48 begin to cone away from one another and, in place of the essentially flat face-to-face contact theretofore, the outer periphery of each spring along its internal face establishes a ring of pressure contact tending more and more to vacate the inner circumference and to concentrate along the mutually apexing outer periphery of the springs. However, all springs performing the dual sealing contine to react, and they receive end thrust from time to time and transmit it to the adjacent outer link, collapsing each time into their initial deflected positions in doing so.

Figure 4:
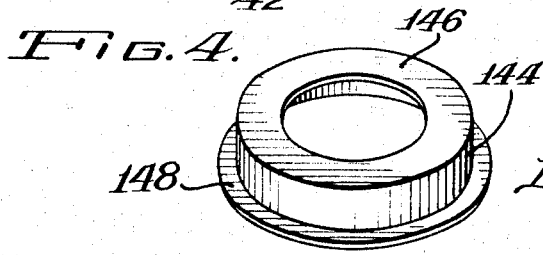
FIGURE 4 is an isometric view of a modified detail.

A modified liner cup 144 is shown in FIGURE 4, having precisely radially extending head and foot flanges 146 and 148, to which the cylindrical body is mutually perpendicular and each of which has a precisely planar configuration. If a cup of the illustrated type 144 is substituted in the foregoing hinge joint at each end of the pin, so that the large diameter flange 148 projects radially outwardly past the outer periphery of the washer 42 and the small diameter flange 146 projects radially inwardly of the inner periphery of the washer 40, each washer can accommodate to relative rotation of the parts by rubbing at all points against a planar wear surface. The disadvantage is that some of the wear take-up travel, formerly contributed to by a frusto-conical shape to the cup flanges, is sacrificed.

In any case, differing dimensions are provided for in order to accomplish the following two results. First, the OD (outside diameter) of the cylindrical body of the cup 44 is radially greater than the ID (inside diameter) of the recess 24 prior to, and yet seats radially within so as to be frictionally fixed in the recess after, it is force fitted into the seated position. Second, the innermost portion of the periphery of the large diameter spring washer 42 is radially greater than the OD of the bushing 20 prior to, and radially less than the OD and torsionally locked to the circumference of the bushing after, application of the force required to bring the two outer links into the assembly.

The following examples of methods of assembly of the links are given by way of description and not limitation.

Example I

Figure 3:
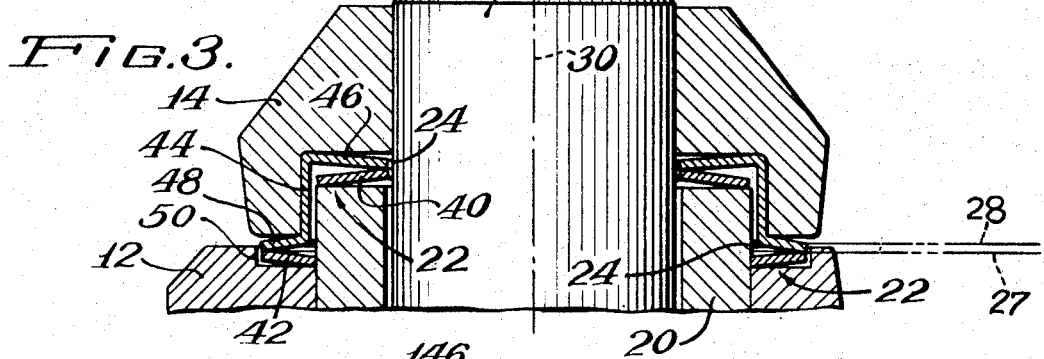
FIGURE 3 is similar to FIGURE 2, but is a post-assembly showing, following service of the joint sufficient for wear to appear.

A serial method of pressing together the assembly includes, as the first step, preassembly of the outer link 14 and the cup 44 (or 144) by inverting the link 14 from the position shown in FIGURE 3, inverting the cup 44 so as to be complementary to the bottom end of a mandrel in a power press, and forcing the cup into a seated position press fitted within the recess 24 of the outer link. The second step in the serial method is preassembly and disposition of the pin 18, bushing 20, and inner link 12 together, with the axis 30 horizontal and with the spring washers 42 and 40 loosely hanging on the respective bushing and pin 18 as shown in FIGURE 2.

Finally, the outer link at each end of the pin is forced toward the inner link 14 at that end by simultaneously pressing the outer links onto the outwardly protruding opposite ends of the pin 18.

Example II

A one-step method of final assembly requires slightly closer tolerances and exactitude of alignment in assembly, but is advantageous in eliminating work operations. From a position in which the parts are loosely assembled and hanging as shown in FIGURE 2, and disposed with the axis 30 horizontal, the outer link at each end of the pin 18 is forced toward the inner link 12 at that end by being press fitted axially over and along the protruding opposite ends of the pin 18. In the one operation, the flange 46 and Belleville washer 40 are forced into flat face-to-face contact, the cup 44 is firmly seated and frictionally affixed to the recess 24, and the flange 48 and Belleville washer 42 are deflected into a configuration with the Belleville washer 42 in flat face-to-face conact with the flange 48 and grippingly seated and frictionally affixed to the adjacent outer surface of the bushing 20.

Seal wear in this dual seal joint is characterized by three significant things. Wear tends to be confined to the interfaces within the seal assembly 22 itself while the washer 42 of one of the dual seals and while the washer 40 of the other of the dual seals are under any appreciable amount of axial preload. The two washers 42 and 40, at least in theory and irrespective of whether the flanges 48 and 46 are likewise functioning as Belleville springs, will continue to expand or cone in taking up end play in the respective seal recesses until the spring metal has reached a fully relaxed condition. Most importantly, the sidewall and the end wall at the base of the recess 24 are at all times protected by a fixed, hardened metal facing, which is readily replaceable when worn so as to insure against an unsound counterbore developing due to actual wear on the counterbore metal.

Variations within the spirit and scope of the invention described are equally comprehended by the foregoing description.

What is claimed is:

1. Sealed joint formed by an endless track pin and bushing, and outer and inner links having press fits respectively on the pin and on the bushing, and having confronting outer link and inner link recesses;

said bushing having a thrust end projecting both toward the base of the outer link recess and at least partway into the latter; and a liner fitted in the outer link recess, said liner having an integral cylindrical portion, a foot end and having at the foot end a generally radial flange received in the inner link recess and forming one element of a multi-element seal therein;

another element of the seal in the seal in the inner link recess comprising a frusto-conical spring washer means.

2. The invention of claim 1, said liner comprising a flanged wear cup characterized by a generally radial head flange received in the outer link recess and forming one element of a second multi-element seal therein; another element of the second seal comprising a frusto-conical spring washer means.

3. The invention of claim 2, characterized by said radial flanges having a flat relaxed position each presenting an undeflecting planar surface.

4. The invention of claim 2, said radial flanges characterized by Belleville springs, having a relaxed frusto-conical shape from which they are elastically deflected toward flat face-to-face contact with respective ones of the frusto-conical spring washer means by forcing one of said links toward the other link.

5. The invention of claim 2, characterized by at least one of the radial flanges being a Belleville spring having a relaxed frusto conical shape.

6. Sealed track joint formed by a pin and bushing, and outer and inner links having press fits respectively on the pin and on the bushing, and having confronting outer link and inner link recesses;

said bushing having a thrust end projecting both toward the base of the outer link recess and at least partway into the latter; and a liner cup fitted in the outer link recess in surrounding relation to the cylindrical projecting thrust end of the bushing, and having at the head end a generally radial flange received in the outer link recess and forming one element of a multi-element seal therein; another element of the seal in the outer link recess comprising a frusto-conical spring washer means.

7. The invention of claim 6, characterized by said liner cup being frictionally affixed to the link recess whereby the head flange is non-rotatably locked with respect to the link.

8. The invention of claim 7, said liner cup characterized by a generally radial foot flange received in the inner link recess and forming one element of a second multi-element seal therein; another element of the second seal comprising a second frusto-conical spring washer means which is against the foot flange and which together therewith, due to relative deflection therebetween, is forced toward flat face-to-face contact therewith in said inner link recess by forcing one of the links toward the other link.

9. The invention of claim 8, characterized by the innermost portion of the periphery of said second frusto-conical spring washer means being radially greater than the OD (outside diameter) of a bushing prior to, and radially less than said OD and torsionally locked to the circumference of the bushing after, application of a flattening deflecting force.

10. Sealed track joint formed by a pin and bushing, and outer and inner links having press fits respectively on the pin and on the bushing;

said bushing having a thrust end portion projecting at least partway into and surrounded in close adjacency by a bushing recess formed in the outer link; and a liner cup having a radial end flange and an integral generally cylindrical body frictionally affixed to and received in the complementary sidewall of the bushing recess so as to form a metal facing on the latter in immediately confronting closely spaced relation surrounding the thrust end portion of the bushing.

11. The invention of claim 10, the liner cup characterized by a radial head flange affixed to the cylindrical body thereof and received on the complementary base of the recess so as to form a sealable metal facing on the latter in aligned registry with the thrust end portion of the bushing.

12. Dual sealed track joint formed by a pin and bushing, and outer and inner links having press fits respectively on the pin and on the bushing, and having confronting outer link and inner link recesses;

said bushing having a thrust end part projecting both toward the base part of the outer link recess and at least partway into the latter; and dual sealing means comprising a small diameter seal in the outer link recess between said parts and a large diameter seal in the inner link recess between the links, the small diameter seal and the large diameter seal each having at least two elements, at least one of the elements in the seals are Belleville springs.

13. The invention of claim 12, characterized by non-rotatable locking means for the elements of the two seals, a plurality of which elements are locked against relative rotation thereby.

14. The invention of claim 13, the small diameter seal characterized by only two elements therein and the large diameter seal characterized by only two elements therein; a major portion of the total number of which elements are locked against the rotation aforesaid by said means.

15. Method of metal facing the bushing recess during final assembly of a track link joint, said joint formed of outer and inner links arranged to be rotatably interconnected by a pin and pin bushing, which links have confronting recesses of which said bushing recess is in the outer link for receiving, in a path of relative movement in the direction of the inner link recess, the thrust end of the pin bushing, said method comprising: the interposition in said path of an assembly of rusto-conical spring washer means and a flanged liner cup having generally radial flange means for effecting engagement with at least one spring washer in the inner link recess; and the relative deflection of the cup flange and one washer toward flat face-to-face contact, accomplished by forcing one of said links toward the other, and characterized by the liner cup being frictionally fixed in the outer link cylindrical recess by lockingly seating therein and said one flattening spring washer being frictionally fixed by contracting the innermost portion of its periphery so as to non-rotatably lockingly grip the bushing thereby.

16. The invention of claim 15, characterized by the liner cup having further generally radial flange means comprising a head flange thereon which is engaged with another spring washer and which due to the relative deflection therebetween is forced toward relative flat face-to-face contact therewith.

17. The invention of claim 16, characterized by the first named cup flange comprising a foot flange, said head and foot flanges comprising frusto-conical springs which flatten under the relative deflection without appreciable permanent set.

References Cited
UNITED STATES PATENTS

| | | | |
|---|---|---|---|
| 694,870 | 3/1902 | Levalley. | |
| 2,061,223 | 11/1936 | Cunningham | 305—14 X |
| 3,050,346 | 8/1962 | Simpson | 305—11 |
| 3,068,712 | 12/1962 | Kuntzmann | 74—255 |
| 3,336,089 | 8/1967 | Krickler | 305—11 |
| 3,376,081 | 4/1968 | Deli et al. | 305—11 |

RICHARD J. JOHNSON, *Primary Examiner.*

U.S. Cl. X.R.

29—148.3; 74—254; 277—65, 212